United States Patent [19]
Ortwerth et al.

[11] 3,942,320
[45] Mar. 9, 1976

[54] SOLID BORON FUEL BURNER FOR RAMJET

[75] Inventors: Paul J. Ortwerth, Rio Rancho, N. Mex.; Lowell W. Ormand, Tucson, Ariz.; David B. Wilkinson, Xenia, Ohio

[73] Assignee: The United States of America as represented by the Secretary of the Air Force, Washington, D.C.

[22] Filed: Oct. 4, 1974

[21] Appl. No.: 512,388

Related U.S. Application Data

[63] Continuation-in-part of Ser. No. 349,900, April 9, 1973, abandoned.

[52] U.S. Cl. ............... 60/270 S; 60/39.47; 60/211; 60/219; 241/54; 241/282
[51] Int. Cl.² .......................................... F02K 7/10
[58] Field of Search ........ 60/270 R, 270 S, 39.46 R, 60/39.47, 253, 254, 256, 251, 219, 220, 211; 241/54, 282

[56] References Cited
UNITED STATES PATENTS

| | | | |
|---|---|---|---|
| 1,551,767 | 9/1925 | Oehmig | 241/54 |
| 2,116,601 | 5/1938 | Frisch | 241/54 |
| 2,651,176 | 9/1953 | Yellott | 60/39.46 R |
| 2,974,478 | 3/1961 | Sweet et al. | 60/270 R |
| 3,049,883 | 8/1962 | Sloan | 60/270 R |
| 3,069,854 | 12/1962 | Toulmin | 60/39.02 |
| 3,182,920 | 5/1965 | Daniels | 241/282 |
| 3,203,171 | 8/1965 | Burke et al. | 60/219 |
| 3,256,688 | 6/1966 | Hill | 60/253 |
| 3,257,801 | 6/1966 | Martinez et al. | 60/219 |
| 3,271,951 | 9/1966 | Nettel | 60/39.46 |
| 3,282,052 | 11/1966 | Lagelbauer | 60/270 R |
| 3,328,805 | 6/1967 | Kuehl et al. | 60/219 |
| 3,346,197 | 10/1967 | Sagar | 241/235 X |
| 3,640,070 | 2/1972 | Kaufman et al. | 60/219 |

FOREIGN PATENTS OR APPLICATIONS

1,007,027   4/1952   France ............................ 60/270 R

OTHER PUBLICATIONS

"Coal Firing Nears The Practical Stage," The Oil Engine & Gas Turbine, June, 1951; pp. 62–63.
Goodrich, W. F., "Pulverised Fuel," Griffin & Co., London, 1924; pp. 9–11.
Harvey, L. C., "Pulverised Fuel, Colloidal Fuel," McDonald & Evans, London, 1924, pp. 372–375.

*Primary Examiner*—C. J. Husar
*Assistant Examiner*—Robert E. Garrett
*Attorney, Agent, or Firm*—Joseph E. Rusz; Richard J. Killoren

[57] ABSTRACT

A solid boron fuel burning ramjet engine having a cylindrical primary burner located within a ramjet combustion chamber. A portion of the air bypasses the primary burner to provide secondary burning at the outlet of the primary burner. Solid boron fuel pellets are ground to powder in a wire brush fuel mill with the fuel then being carried to the primary burner by air which is passed through the fuel mill.

2 Claims, 4 Drawing Figures

SOLID BORON FUEL BURNER FOR RAMJET

RIGHTS OF THE GOVERNMENT

The invention described herein may be manufactured and used by or for the Government of the United States for all governmental purposes without the payment of any royalty.

REFERENCE TO RELATED APPLICATIONS

This is a Continuation-In-Part of our application "Solid Fuel Burner for Ramjet Engine" Ser. No. 349,900, filed Apr. 9, 1973, and now abandoned.

BACKGROUND OF THE INVENTION

The burning of solid fuels such as boron in ramjet type engines has presented many problems. It has been difficult to supply the boron to the burner at a uniform rate and it has been difficult to maintain the ignition temperature for the boron.

When air or other gas has been used as a carrier for the solid boron fuel, it has been difficult to maintain a uniform flow. Solid boron fuel slurry has been found to be difficult to pump and regulate and it has been difficult to provide a uniform burning for solid boron fuel delivered in this manner. In the past, solid boron has always been burned in the presence of another more easily burned fuel.

BRIEF SUMMARY OF THE INVENTION

According to this invention, a uniform fuel flow rate is achieved by grinding boron fuel pellets in a specially constructed mill having a gas flow therethrough for delivering the boron fuel to the combustion chamber.

The burner for the boron fuel is built by providing a chamber with a wall of a refractory material wherein the wall becomes heated so that the incoming solid particles are heated, to combustion temperature, by radiation from the burner wall.

IN THE DRAWINGS

DETAILED DESCRIPTION OF THE INVENTION

Figure 1:
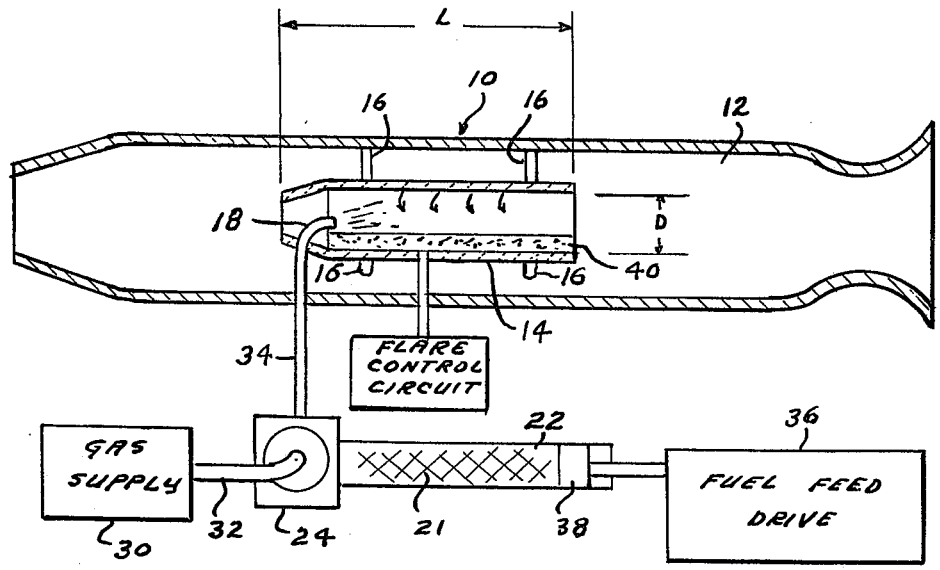
FIG. 1 is a schematic view partially in section of a solid boron fuel ramjet according to one embodiment of the invention.

Reference is now made to FIG. 1 of the drawing which shows a ramjet 10, having a combustion chamber 12. A primary burner 14 is supported within the combustion chamber by means of supports 16. The burner may be made of a refractory material such as $Z_rO_2$, or may be steel tube coated on the inner surface with graphite, magnesia, alumina or other refractory coating. The burner 14 should have a ratio of length L to diameter D great enough to prevent excessive radiation loss through the ends of the tube. It has been found difficult to maintain uniform burning of the solid boron fuel in burners wherein the ratio $L/D = 2$ or less. Burners with a ratio L/D approximately three to one have been found to provide very satisfactory operation. Any burner with a ratio L/D greater than two and a half to one will provide adequate burning; however, for some applications greater lengths may be desired.

Figure 2:
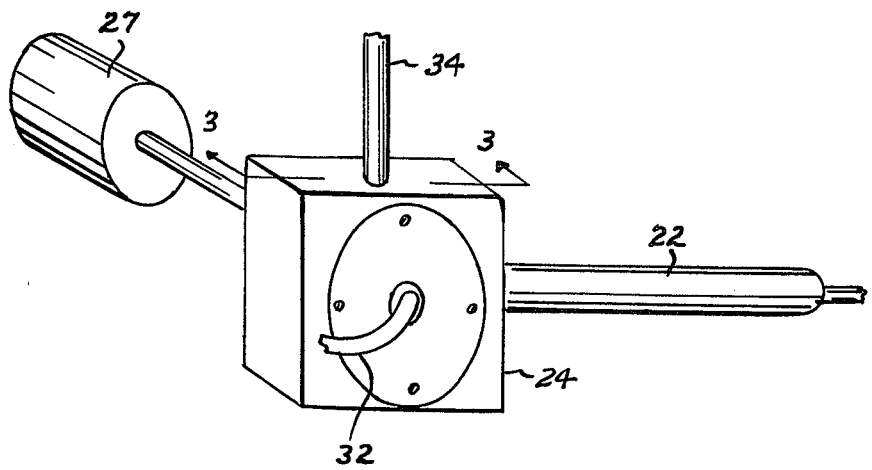
FIG. 2 is an isometric view of the fuel mill for the device of FIG. 1.
Figure 3:
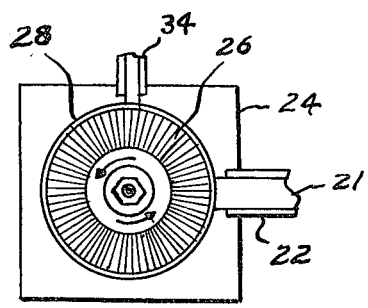
FIG. 3 is a sectional view of the device of FIG. 2 along the line 3—3.

A solid boron fuel is supplied to a nozzle 18 in the manner shown in FIGS. 2 and 3. The boron pellets are stored in a fuel pellet chamber 22. The fuel mill 24 consists of a wire brush 26 rotating in a chamber 28. The brush 26 is made to substantially fill the chamber 28, leaving very little void space for fuel particles to collect. The brush may be driven by a motor 27 or a belt and pulley or other well known means. Air or other gas under pressure is supplied to the chamber 28 from gas supply 30 through supply duct 32. The gas and fuel particles leave the mill 24 through outlet 34. The direction of rotation of the wire brush is such that the particles removed from boron fuel pellets 21 are moved toward outlet 34. The drive 36 for piston 38 may be a hydraulic drive for some applications or may be a screw drive with the advance of the screw drive being made to conform to the desired milling rate for the fuel pellets. A pyrotechnic flare 40 is provided for igniting the ramjet engine in a conventional manner.

While the device has been described for use with boron pellets, it could be adapted for use with other pellets such as aluminum or coal pellets. The pellets are made from material which has been ground to about 1 micron size and compressed into elongated round pellets approximately equal to the inner diameter of pellet chamber 22. The feed for the fuel, as shown, is only illustrative as the system used would normally provide for a much larger quantity of fuel, such as with a system for recharging the feed system. Also, the size given for the pellets is only illustrative and systems using larger or smaller pellets could also be provided.

In one device constructed, the feed tube 22 was stainless steel with ¾ inch bore about 44 inches long. The pellets were approximately 11/16 inch diameter and about 3 inches long. The piston 38 was driven by a worm gear which in turn was driven by a 1 hp motor. The wire brush in the fuel mill was also driven with a 1 hp motor. The brush was a standard 2½ inch brush with 0.015 mill wire and a ⅝ inch arbor hole. The brush was driven at 6,000 RPM. Air at 30 psi was supplied to the mill through a ⅜ inch plastic tube with the fuel being supplied to the burner through a ¼ inch stainless steel tube. The burner was $Z_rO_2$ with a ¾ inch inside diameter and a length of 20 inches which provided nearly 100% burning efficiency. However, with bypass air path to provide after burning shorter tubes may be used.

Figure 4:
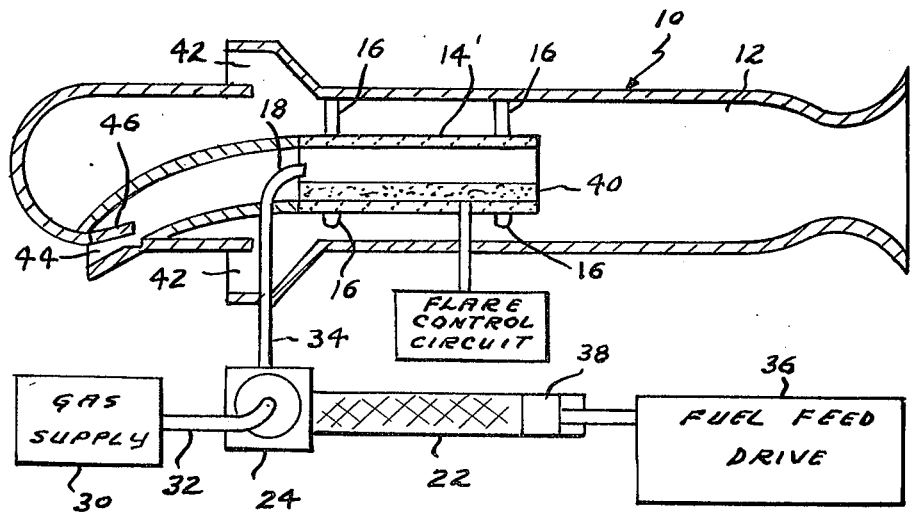
FIG. 4 is a schematic view partially in section of a solid boron fuel ramjet according to another embodiment of the invention.

For some applications, it may be desirable to mount the ramjet burner at the aft end of a vehicle as shown in FIG. 4, wherein the fuel supply is the same as described above but with the secondary air being supplied through inlets 42 and with the air for the primary burner being supplied through an inlet 44. A variable inlet gate 46 may be provided for controlling the air flow to the primary burner 14'.

While not shown, a variable inlet could also be provided with the device of FIG. 1. Also, though only one primary burner has been shown in the ramjet combustion chambers, in some applications more than one primary burner may be provided.

There is thus provided a ramjet system for burning solid boron pellets, wherein a portion of the boron reacts on the hot refractory wall releasing its heat of formation, and wherein radiant energy transfer from the hot wall alone can be used to elevate the temperature of boron to the ignition temperature. This system also provides for burning of boron in the absence of any aerodynamic recirculation zones to act as a flame holder, as is the usual practice for ramjets and turbojets which employ many cans, baffles, steps or swirl zones of stagnant hot gas for ignition, and eliminates the drag of such devices and the power they require.

We claim:

1. A solid boron fuel burning ramjet engine, comprising, a combustion chamber; said combustion chamber having an air inlet at one end and an exit nozzle at the other end; a burner for powdered solid boron fuel within said combustion chamber; said burner having a substantially cylindrical tubular member with a refractory inner wall; said tubular member having a length to diameter ratio of at least 2.5 to 1; a fuel mill; said fuel mill having a circular chamber and a wire brush positioned within said chamber, substantially filling said chamber; means for rotating said brush at a predetermined speed; means for continuously supplying solid boron fuel pellets to the fuel mill; said means for continuously supplying solid boron fuel pellets to said fuel mill including means for positioning a fuel pellet against the periphery of said wire brush; means for advancing pellets toward the wire brush at a predetermined rate; a fuel outlet positioned adjacent the periphery of said brush at a position angularly displaced from said pellet positioning means; means, connected to said fuel outlet, for supplying powdered solid boron fuel from the fuel mill to said burner; means for providing a gas flow through said circular chamber around said wire brush to said outlet and then to the burner to carry the fuel from the fuel mill to the burner; means for supplying air from said air inlet to said burner; said burner being spaced from the wall of said combustion chamber for providing a secondary air flow path around the burner to thereby provide secondary burning at the outlet of said burner; means for igniting said burner.

2. The device as recited in claim 1 including means for varying the flow of air to said burner; a separate inlet means for providing air flow in the secondary air flow path.

* * * * *